Patented May 5, 1931

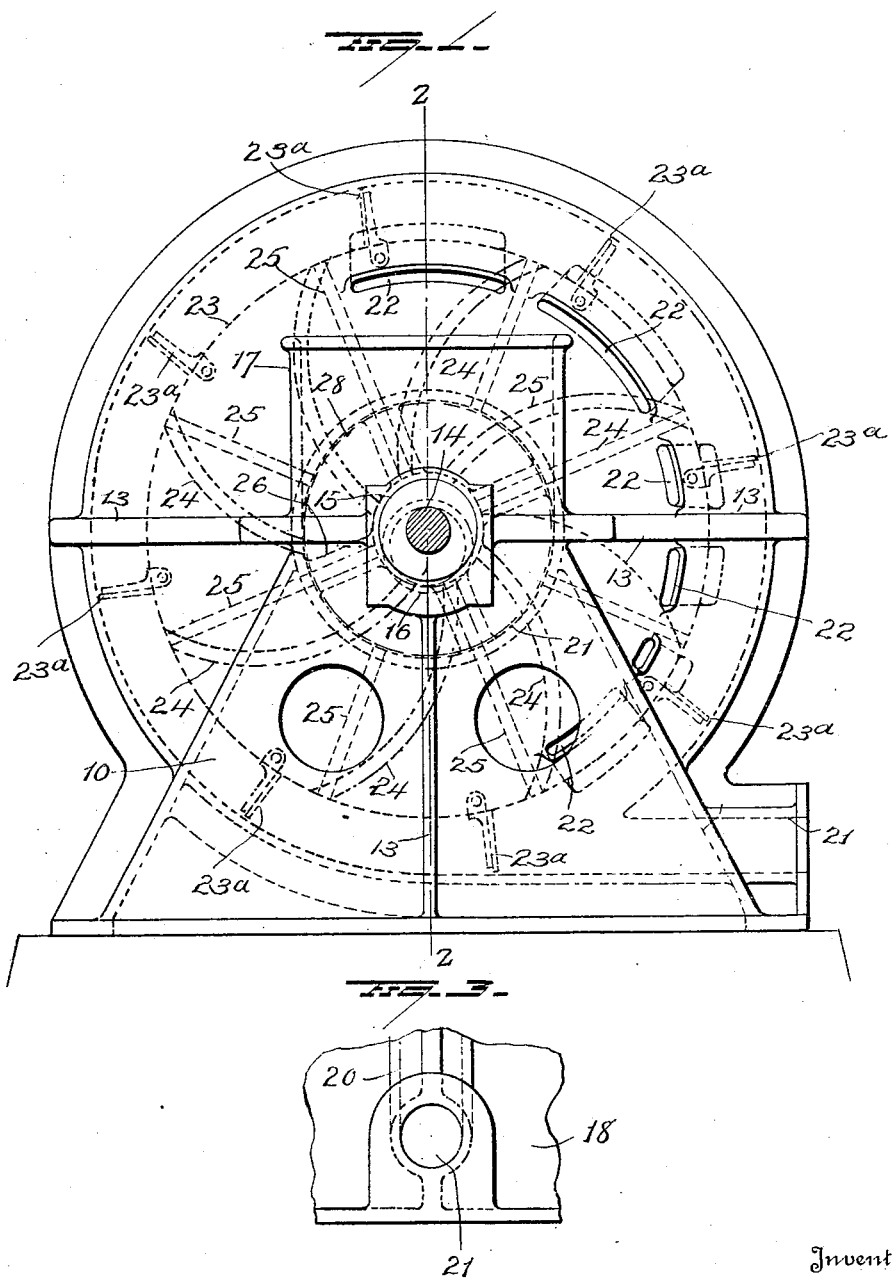

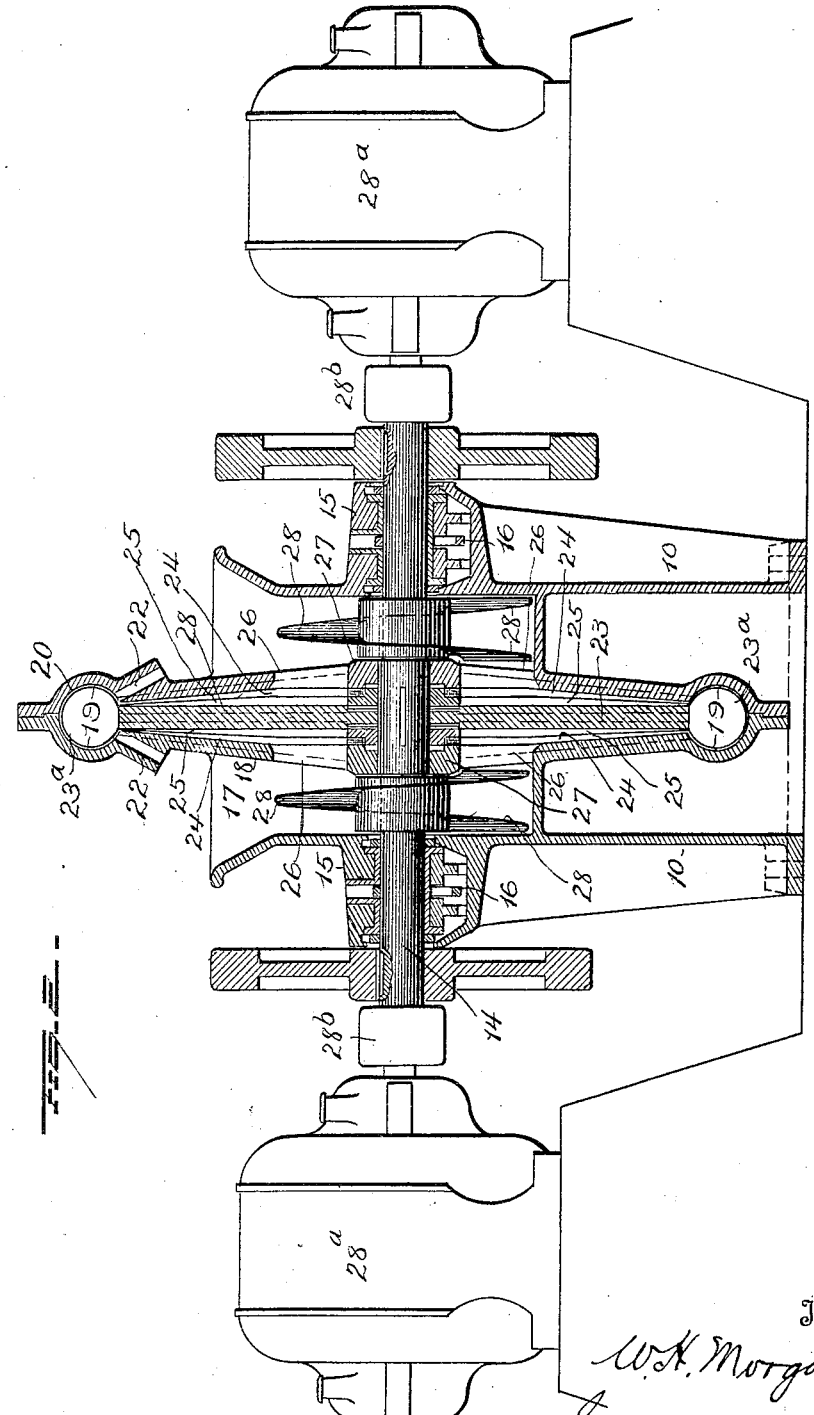

1,804,267

UNITED STATES PATENT OFFICE

WILLIAM HENRY MORGAN, OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

SHEARING OR DISINTEGRATING SUGAR CANE

Application filed May 5, 1925, Serial No. 28,266. Renewed February 8, 1929.

This invention relates to machines for disintegrating sugar cane to prepare the cane for the extraction of the juice therefrom.

The principal objects of the invention are to improve the construction and mode of operation of machines for disintegrating sugar cane stalks and to produce an improved cane stalk disintegrating machine which will operate in an efficient manner to reduce the cane to a loose fibrous mass containing relatively long fibres of the cane.

In the accompanying drawings:

Figure 1 is a view in side elevation of my improved disintegrator, the knives or shear blades being shown in dotted lines;

Figure 2 is a view in section on the line 2—2 of Figure 1, some parts being shown in elevation, and Figure 3 is an end view of the casing showing the outlet from the circular trough.

The present apparatus is designed particularly as an improvement on the apparatus shown in my reissue Patent No. 17,513, dated December 3, 1929. In the machine shown and described in this patent, sugar cane, preferably cut into short sections about six inches in length, is subjected to the action of disintegrating blades or cutters which cut or split the stalks repeatedly longitudinally or in the general directions of the axes of the stalks to reduce the same to a disintegrated fibrous mass containing relatively long fibers of the cane. The longitudinal splitting or cutting of the cane is highly important in that the longitudinal fibers are preserved in the disintegrating operation, and is to be distinguished from disintegration by cutting the cane transversely which destroys the long fibers and converts the cane into a pulpy mass.

The disintegrator or shredder comprises a frame or housing 10, preferably having two side sections, and each section is preferably made of two parts each provided with horizontal flanges 13 located in line with the shaft 14.

The side sections of the casing are provided with bearings 15 for the shaft 14 which carries suitable lubricating devices 16. The side sections are also provided with hoppers 17 each having a flaring upper end. The respective side sections also comprise spaced, fixed disks 18, preferably saucer-shaped as shown in Fig. 2, and inclined inwardly from their common axis toward each other and each formed at its periphery with a portion semi-circular in cross-section, as shown in this figure. When the disks are assembled the semi-circular peripheral portions of the disks form a circular trough 20 having an outlet 21 at the base thereof, as shown in Fig. 1.

The upper and lower parts of the stationary disks and the upper portions and bottom portions of the hoppers are preferably respectively formed integral with the corresponding portions of the side sections of the casings. As shown in Figs. 1 and 2, two hoppers are formed, one at the outer side of each stationary disk, through which the cane stalks are fed through the openings in the disks.

Each stationary disk is also provided with air inlets 22 leading to the trough 20 through which air may freely enter and through which it is drawn by the fan blades 23ª which will be hereinafter referred to.

The two side sections of the frame 10 are bolted or otherwise secured together. The upper half of the frame, comprising the upper parts of the two side sections, is removably attached to the lower half of the frame comprising the lower parts of said two side sections. As shown, the upper half of the frame is provided with flanges 13 which engage corresponding flanges on the lower half of the frame and the upper and lower halves are secured together preferably by bolts passing through these flanges.

By removing the upper half of the frame, access may be had to the interior of the frame and the disintegrating disks for repairing these parts and for removing any material that may become clogged between the disintegrating disks.

Fixed to the shaft 14 is a rotary disk 23 preferably flat in form and located intermediate between the two fixed disks in the position shown in Fig. 2 so that the peripheral face of the disk forms the inner face of the trough 20. The rotary disk is provided on its outer faces with a series of disintegrating blades or cutters 24 preferably scimitar shaped as shown in dotted lines in Figure 1. These blades are preferably seated and secured in similar shaped grooves in the outer faces of the rotary disk 23, and coact with blades or cutters 25 which are carried by the fixed disks and which preferably are substantially straight and arranged radial to the disks as shown in Figure 1. These blades or cutters 25 are secured to the inner faces of the stationary disks 18, and preferably are located in grooves formed in said disks. The cutters carried by the outer and inner disks are preferably so adjusted that their meeting or cutting edges are approximately in contact, and may be adjusted when necessary by shims inserted in the grooves under the cutters. The fixed disks and the rotary disks thus constitute relatively movable supports for the cutters respectively carried thereby.

Each stationary disk is provided centrally with an opening and with spokes 26 which connect the outer portion of the disks with the hubs 27 thereof, the openings between the spokes being of ample size to permit the cut stalks to enter between the stationary and rotary disks. The spaces between said disks are of such size that the cut stalks may readily enter and be guided to position with the long axes of the stalks in planes substantially at right angles to the shaft 14.

With the stalks thus positioned between the fixed and rotating disks the cutting blades will repeatedly cut the stalks in general directions longitudinally of the same during the passage of the stalks from the central portions of the disks to the peripheries thereof and will reduce the stalks to a disintegrated long-fibered mass.

Secured to the shaft 14 within the respective hopper, at opposite sides of the fixed disks, and of a diameter approximately the size of the openings in said fixed disks, are the screw or propeller shaped feeding devices 28 which are constructed to feed positively the stalks through the openings in the respective disks.

The cutting blades or shearing devices are made tapering as shown to correspond with the diminishing of the width of the spaces between the fixed and rotating disks. The width of the spaces between the stationary and rotary disks, at the periphery of the latter is comparatively slight, thus absolutely preventing anything but the finely divided shreds of stalks from passing out into the trough 20. The passage or movement of the shreds or sections of the stalks to the trough is caused by centrifugal action and also by the shape of the blades on the rotary disk. Ample clearance is provided for the entrance of the stalks into the spaces between the disks adjacent the axis of the disks. The spaces between the fixed and rotating disks immediately outside of the feed openings have a width sufficient to enable the stalk sections readily to pass from the feed openings into these spaces. The width of these spaces, however, at the inner portions thereof is restricted so that the stalk sections upon entering the same are located with their axes substantially parallel with or extending in the same general direction as a plane perpendicular to the axis of the disks.

In order to create air currents flowing from the axis of the disks outwardly through the spaces between the same, fan blades 23 are mounted upon the periphery of the rotating disk. These fan blades are located within the peripheral trough 20 and are shaped to conform to the cross sectional area of the trough. These blades operate not only to draw air in through the openings 22 and create a suction which tends to draw the sheared sections of stalks into the trough, but create a blast which drives the said sheared sections around the trough to the outlet or discharge opening 21, and also prevents the trough from clogging.

The shaft 14 is driven by the motors $28^a$, preferably one at each end of the shaft, the armature shaft of the motors being connected to shaft 14 by coupling $28^b$.

If desired suitable transmission gearing may be provided to connect the armature shafts of the motors, with shaft 14, so as to enable the shaft to be connected with or disconnected from either of said motors. The motors may be of such capacity that one will be sufficient to drive the shaft.

In the event of accident to one of the motors, the other motor may be used, thus providing for the continuous operation of the rotary disk.

Instead of making the outer fixed disks saucer-shaped or concave on the inner sides thereof, these disks may be provided with substantially flat inner surfaces or with inner surfaces of any other suitable form and the outer faces of the inner disk may be correspondingly formed to provide spaces between the fixed and rotating disks diminishing in width from the axis of the disks outwardly.

In the operation of the apparatus, the cane stalks introduced into the hoppers are fed by the conveyors or feeders 28 through the feed openings in the fixed disks into position to be engaged by the blades or cutters on the rotating disk. The stalks as they are engaged by the rapidly rotating blades on the rotating disk will be carried about the axis of the disks and will be thrown outwardly by centrifugal force through the spaces between the disks. The width of the spaces between the fixed and rotating disks at the inner or entrance portions of these spaces is such that the stalks may readily enter the same and that they are positioned with their axes substantially parallel with or extending in the same general direction as a plane substantially perpendicular to the axis of the disks. The air currents created by the fan blades 23ª flowing outwardly from the axis of the disks through the spaces between the same tend to carry the stalks outwardly away from the axis of the disks. The blades or cutters on the rotating disk because of their scimitar shape tend to deflect the stalks outwardly and this also aids the progress of the stalks from the axis of the disks toward the peripheries thereof.

During the passage of the cane stalks through the spaces between the disks the stalks are engaged by the relatively moving blades carried respectively by the fixed and rotating disks and are repeatedly split or divided in the general directions of the axes of the stalks. As the stalks pass outwardly toward the peripheries of the disks they are divided into finer and finer particles until they are thoroughly disintegrated. The restricted width of the spaces between the fixed and rotating disks at the peripheries thereof prevents the stalks from passing from these spaces into the peripheral trough until the stalks have been disintegrated to a predetermined degree of fineness. Because of the splitting or dividing of the stalks in the general direction of the axes of the same, the length of the fibers is preserved and the stalks are disintegrated into a long fibered hay-like mass. During the disintegrating operation because of the thoroughness of the disintegration of the cane stalks and because of the violent impacts to which the stalks are subjected, substantially all of the juice cells are broken up thereby freeing substantially all of the juice in the stalks. The casing 10 retains the liberated juice in contact with the disintegrated solid constituents of the cane and the juice is reabsorbed in the fibrous mass formed by said constituents prior to the delivery of the disintegrated material from the apparatus. The disintegrated stalks pass from the spaces between the fixed and rotary disks into the peripheral trough and are carried by the fan blades to the discharge outlet 21 and are discharged therefrom into a receptacle or onto a conveyor.

It is evident that many slight changes might be resorted to in the relative construction and arrangement of parts shown and described without departing from the spirit and scope of my invention. Hence I would have it understood that I do not wish to confine myself to the exact construction and arrangement of parts shown and described.

Having fully described my invention what I claim as new and desire to secure by Letters-Patent, is:—

1. An apparatus for disintegrating sugar producing material comprising two spaced fixed disks each having disintegrating cutters on its inner face, a shaft passing through said disks, a disk secured to said shaft between the fixed disintegrating disks and provided with disintegrating blades or cutters, a hopper, and feeding means secured to the shaft and adapted to feed the material inwardly through the feed openings in the two fixed disks.

2. An apparatus for disintegrating sugar cane comprising two spaced fixed disks each having disintegrating devices on its inner face and each having a feed opening through same, a rotary shaft passing through said disks, a disk secured to said shaft between and in spaced relation to said fixed disks and provided with disintegrating means on its outer faces, the spaces between said fixed and rotating disks being greater in width adjacent the feed openings in the fixed disk and gradually converging toward the peripheries of the disks and means for feeding the stalks through the two feed openings in the fixed disks.

3. An apparatus for shredding cane stalks, consisting of two spaced saucer shaped stationary disks each having shredding means on its inner face, and each having a feed opening through the same, a rotary shaft passing through said disks, a flat rotary disk mounted on said shaft between said fixed disks and provided with shredding means on its outer faces which co-act with the shredding means on the inner faces of the stationary disks, and means for feeding the stalks through the feed openings in the stationary disks.

4. In an apparatus for disintegrating sugar cane stalks, the combination of two spaced fixed disks each provided on its inner face with shearing blades, and each provided with a centrally located feed opening, a shaft mounted to rotate and passing centrally through said disks, a hopper for each fixed disk, a disk secured to said shaft between the fixed disks and provided with disintegrating blades, which cooperate with the blades on the fixed disks and a screw conveyor in each hopper for positively feeding the cut stalks from the hoppers into the spaces between the fixed and rotary disks.

5. In an apparatus for shredding cane stalks, the combination of two spaced saucer shaped fixed disks, each provided on its inner face with shredding blades, and each provided with a feed opening, a shaft passing through the disks, means for rotating said shaft, a flat disk secured to said shaft intermediate between the fixed disks and provided on its outer surfaces with shredding blades, a hopper for each feed opening, and screw shaped feeding devices secured to the shaft and adapted to force the cut stalks through the feed openings in the fixed disks.

6. In an apparatus for shredding sugar cane, the combination of two spaced fixed disks each having shearing or shredding cutters on its inner face, and provided at their peripheries with a trough into which the sheared material is discharged, the said trough being provided with an outlet, the disks being centrally provided with feed openings, a shaft passing through said disks, a rotary disk secured to said shaft between the fixed disks and provided with shredding blades or cutters, and means for feeding the material into the spaces between the fixed and rotary disks.

7. In an apparatus for shearing sugar cane, the combination of two spaced fixed disks each having shearing blades on its inner face and provided centrally with feed openings and at their peripheries with a continuous trough, the latter having air inlets, and an outlet for the sheared material, a shaft passing through said disks, a rotary disk secured to the shaft between the fixed disks and provided with shearing blades which cooperate with the blades on the fixed disks, and a hopper from which the material is fed into the spaces between the fixed and rotary disks.

8. In an apparatus for shredding sugar cane, the combination of two spaced fixed disks having centrally located feed openings, cutting blades on their inner faces, and a concentric trough at their peripheries, the trough having an outlet opening and air inlet openings, a shaft passing through said disks, a disk secured to the shaft between the fixed disks and provided on its opposite faces with shredding blades or cutters, and at its periphery with fan blades adapted to create suction between the fixed and rotary disks and also a blast to force the disintegrated mass to the outlet opening in the trough, and hoppers from which the material is fed to the spaces between the fixed and rotating disks.

9. A machine for disintegrating cane stalks having in combination stalk shearing devices, means for positively directing the cane stalks with relation to said shearing devices to cause said devices to shear the stalks in the general directions of the axes thereof to reduce the stalks to a fibrous mass, and means for feeding positively stalk sections several inches in length into position to be engaged by said directing means and said shearing devices.

10. A machine for disintegrating cane stalks having in combination cane cutting devices, spaced walls cooperating with said cutting devices and arranged to direct and locate the cane stalks in positions to cause said devices to cut or split the cane in a general direction lengthwise of the stalks, means for relatively moving said devices, and means for feeding stalk sections several inches in length positively into position to enter between said walls.

11. A machine for disintegrating cane stalks having in combination relatively movable cane cutting devices, relatively movable supports for said devices having surfaces for directing and positioning the cane with relation to said devices to cause said devices to cut or split the cane repeatedly in general directions lengthwise of the stalks, means for relatively moving said supports to actuate relatively said cutting devices, and means for feeding the cane to be disintegrated into position to engage said surfaces.

12. A machine for disintegrating sugar cane stalks comprising, in combination, cane-confining walls separated by a relatively narrow space through which the cane stalks are passed, means for splitting the cane stalks in general directions longitudinally of the stalks while confined in the narrow space between said walls to reduce the same to a fibrous mass, and positively acting stalk feeding means for feeding stalk sections several inches in length into position to enter between said walls.

13. In a machine for disintegrating cane stalks, the combination of a plurality of stationary cutting members, a plurality of rotatable cutting members cooperating with said stationary members to disintegrate the cane stalks, cane positioning means for locating the cane stalks with relation to said cutting members in positions to cause said cutting members to cut or split the stalks in general directions longitudinally of the stalks to reduce the same to a loose fibrous mass, and positively acting cane stalk feeding means for feeding stalk sections several inches in length to said positioning means.

14. A machine for disintegrating cane stalks, having in combination a member having a cane confining face, a rotary member having a cane confining face arranged in opposed relation to and spaced from said face of said first member, devices carried respectively by said members for splitting the stalks in general directions longitudinally thereof to disintegrate the stalks into a fibrous mass, and means for feeding positively stalk sections several inches in length into the space between said members.

15. A machine for disintegrating cane stalks, having in combination a member having a cane confining face, a rotary member having a cane confining face arranged in opposed relation to and spaced from said face of said first member, devices carried respectively by said members for cutting the stalks in the general directions of the axes of the stalks to disintegrate the stalks into a fibrous mass, and means for positively feeding cane stalk sections several inches in length to the space between said members at one or more points adjacent the axis of the rotary member.

16. A machine for disintegrating cane stalks, having in combination two members spaced from each other and each having an inner cane confining face, a rotary member mounted to rotate between said first two members and having outer cane confining faces arranged in opposed relation to and spaced from said faces of said first members, and devices projecting from the cane confining faces of said members and cooperating to split the cane stalks in the general directions of the axes thereof to reduce the same to a long fibered disintegrated mass.

17. A machine for disintegrating cane stalks, having in combination a stationary member having an inner cane confining face, a rotary member having a cane confining face arranged in opposed relation to and spaced from said face of said stationary member, the space between said members diminishing in width outwardly from the axis of said rotary member, devices carried respectively by the fixed and rotary members for dividing repeatedly the stalks in the general directions of the lengths thereof to reduce the stalks to a fibrous disintegrated mass, and means for feeding positively cane stalks sections several inches in length into the space between said members at one or more points within the peripheral portion of said space.

18. A machine for disintegrating cane stalks having in combination means for confining the stalks within a relatively narrow space extending outwardly from a given axis, means for whirling the stalks about said axis and for disintegrating the same while thus confined to reduce the stalks to a loose fibrous mass, and means for feeding stalk sections several inches in length positively to said stalk-confining means.

19. A machine for disintegrating cane stalks having in combination means for confining the stalks within a relatively narrow space, means for disintegrating the stalks progressively into finer and finer particles while passing through said space, said confining means being constructed to prevent the discharge of the disintegrated stalks until a predetermined degree of fineness is reached, and means for feeding positively stalk sections several inches in length to said confining means.

20. A machine for disintegrating cane stalks having in combination cane cutting devices, means for positively directing the cane with relation to said cutting devices to cause said devices to shred the stalks in the general direction of the axes thereof to reduce the stalks to a fibrous mass, and means for feeding stalk sections several inches in length into position to be engaged by said cutting devices.

In testimony whereof, I have signed this specification.

WILLIAM HENRY MORGAN.